United States Patent [19]

Alberghini et al.

[11] Patent Number: 5,060,453

[45] Date of Patent: Oct. 29, 1991

[54] HOT FILL CONTAINER WITH RECONFIGURABLE CONVEX VOLUME CONTROL PANEL

[75] Inventors: Alfred C. Alberghini, Dunwoody; David A. Brunson, Marietta; Stephen R. Lynn, Douglasville, all of Ga.

[73] Assignee: Sewell Plastics, Inc., Atlanta, Ga.

[21] Appl. No.: 556,536

[22] Filed: Jul. 23, 1990

[51] Int. Cl.$^5$ .......................... B65B 3/26; B65B 3/28; B65B 7/28; B67B 3/20

[52] U.S. Cl. ........................................ 53/440; 53/471; 53/486; 53/282; 53/289; 53/420

[58] Field of Search ................. 53/486, 289, 113, 511, 53/512, 526, 527, 433, 434, 439, 471, 281, 282, 440, 420

[56] References Cited

U.S. PATENT DOCUMENTS

| | | | |
|---|---|---|---|
| 2,329,311 | 9/1943 | Waters | 53/289 X |
| 3,103,089 | 9/1963 | Allen | 53/289 X |
| 3,295,293 | 1/1967 | Lodding | 53/486 |
| 3,325,031 | 6/1967 | Singier | . |
| 3,342,009 | 9/1967 | Anderson | 53/486 X |
| 3,457,694 | 7/1969 | Tatibana | 53/289 X |
| 3,491,803 | 1/1970 | Galik | 53/289 X |
| 3,577,698 | 5/1971 | Ruekberg | 53/289 X |
| 3,590,557 | 7/1971 | Vogel | 53/289 X |
| 3,625,786 | 12/1971 | Pearson et al. | 53/289 X |
| 3,674,060 | 7/1972 | Ruekberg | 53/289 X |
| 3,748,209 | 7/1973 | Pearson et al. | 53/289 X |
| 3,945,174 | 3/1976 | Franz | 53/289 |
| 3,973,603 | 8/1976 | Franz | 53/289 X |
| 4,054,017 | 10/1977 | Naumann | 53/511 |
| 4,338,765 | 7/1982 | Ohmori et al. | 53/289 X |
| 4,381,061 | 4/1983 | Cerny et al. | . |
| 4,542,029 | 9/1985 | Caner et al. | . |
| 4,796,411 | 1/1989 | Kimura et al. | 53/486 X |
| 4,805,788 | 2/1989 | Akiho | . |
| 4,807,424 | 2/1989 | Robinson et al. | 53/289 X |
| 4,863,046 | 9/1989 | Collette et al. | . |
| 4,877,141 | 10/1989 | Hayashi et al. | . |
| 4,905,450 | 3/1990 | Hansen et al. | 53/434 X |
| 4,926,613 | 5/1990 | Hansen | 53/433 |

Primary Examiner—Horace M. Culver
Attorney, Agent, or Firm—Locke Reynolds

[57] ABSTRACT

A blow-molded and tempered PET container specially adapted for hot filling includes a plurality of panels situated in circumferentially spaced locations around the periphery of the container, the panels bulging outwardly with respect to the body portion immediately contiguous thereto. The panels are mechanically reconfigurable to an inwardly collapsed position with respect to the immediately contiguous body portion for providing controlled volumetric reduction of the container to compensate for the development of a partial vacuum within the container.

4 Claims, 2 Drawing Sheets

HOT FILL CONTAINER WITH RECONFIGURABLE CONVEX VOLUME CONTROL PANEL

BACKGROUND OF THE INVENTION

This invention relates to containers made of thermoplastic material especially adapted to be filled with a hot liquid or semi-liquid product and hermetic sealed. The invention particularly relates to improvements in container design and filling operations so as to achieve a filled container which when cooled retains a desired container configuration despite the development of a partial vacuum within the container.

When a container is filled with a liquid or semi-liquid material, it is conventional packaging practice to leave a small, unfilled volume at the top of the container, called the head space. Typically, the head space of a fully filled container comprises about five percent of the total container volume. When such container filling occurs with the filling material in a hot condition, the air or gas in the head space is heated to about the same temperature as the filling material. After the container is filled, the container is quickly hermetically sealed with a cap preventing the influx of any air or gas within the container. Typically, such capping occurs within a matter of seconds so that no appreciable cooling of the container contents occurs prior to the hermitic sealing.

As the product within the container cools, the material forming the liquid or semi-liquid contents shrinks in volume thereby enlarging the head space typically by 80% or more. This increase in gas volume causes a decrease in pressure in general accord with Boyle's law. The drop in temperature of the gas within the head space also contributes to a decrease in pressure in general accordance with Gay-Lussac's law. The combined decrease in pressure is sufficient for a significant partial vacuum to develop. Thus, in containers having substantially fixed dimensions, such as those constructed of glass, a partial vacuum develops which may, be exhibited in an elastic inward deflection of the cap closing the fixed dimensional container. In containers having more flexible walls, the wall of the container often elastically deforms and at least partially collapses to the extent necessary to substantially reduce or eliminate the partial vacuum within the container. Such container deformation is commonly referred to as "paneling."

The paneling of a sealed container due to a cooling of the product within the container often makes the container appear misshapened, but generally does not detrimentally affect the quality of the product held by the container. However, there is often some consumer resistance to purchasing misshapened containers possibly based on a misguided assumption that the container is somehow less than full or the contents is no longer satisfactory. In addition to any consumer resistance to a randomly paneled container due to the undesirable appearance, it has been recognized that the container itself loses side wall symmetry and, hence, column strength which often prevents stacking of the containers for display or storage. Due in large part to cost considerations, it has been found desirable to lower the thickness of the side wall in the containers thus inherently making the side wall even more susceptible to vacuum induced paneling.

To diminish this consumer resistance to paneled containers, and to provide enhanced side wall symmetry so as to permit stacking, some containers have been designed to incorporate special features called vacuum deflection panels intended to be displaced inwardly in response to product shrinkage and cooling. The early solutions to the problem concentrated on providing structure for the ends, particularly the bottoms, of containers which would flex upwardly in response to a lowering of pressure within the container. More recently, various designs of side structures have been attempted to achieve the same result. Examples of such containers are to be found in U.S. Pat. Nos. 4,381,061; 4,542,029; 4,805,788; 4,863,046; and, 4,877,141. Many of these patents are directed to blow-molded containers of a biaxially oriented polymer such as polyethylene terephthalate resin (hereinafter referred to merely as PET). The PET containers are flexible yet self-supporting, that is, they do not collapse under their own weight.

Typically, the vacuum deflection panels in blow-molded PET containers of the prior art have been initially formed so they are slightly concave with the action of the partial vacuum within the container causing the panel to become increasingly concave as well as inwardly displaced. Generally, the side structure has consisted of inwardly indented panels adapted to flex still further inwardly into the container to offset the decrease in volume due to the cooling of the liquid product as well as the cooling of the gas within the head space. Despite the presence of the vacuum deflection panels, an inward deflection of a container wall can occur at a location other than at the vacuum deflection panel. To reduce the occurrence of misplaced container wall deflection, it has been found necessary to include various wall strengthening features and panel separating features so as to provide the desirable panel movement in response to the existence of the partial vacuum.

To ensure that the thin-walled PET containers have sufficient rigidity to withstand any panel collapse and to withstand the initial hot filling, the containers are typically thermally treated prior to filling and either during or subsequent to the blowing operation so as to enhance the stability of the container. This thermal treatment has the effect of rigidifying the container when cool so that the deflection of the panels becomes increasingly difficult. To offset this reduced deflection of each panel, the number of panels is increased to accommodate the required volumetric change in the container.

The vacuum deflection panels have often been included in a cylindrical body portion of a container, often referred to as the label panel where, typically, a label is applied to the container. While the presence of the label tends to hide the vacuum deflection panels, the presence of a large number of such panels significantly diminishes the label support thus making the label appear wrinkled or otherwise distorted thereby detracting from the product appearance.

SUMMARY OF THE INVENTION

To overcome these and other related problems, a container made in accordance with the present invention includes a plurality of panels circumferentially spaced around the periphery of a container body. The panels are initially molded to bulge outwardly with respect to the body portion immediately contiguous to the panels. The panels are designed to be mechanically reconfigured to an inwardly collapsed position with respect to the immediately contiguous body portion. The size and curvature of the panels are selected to provide a controlled volumetric reduction of the container to compensate for the development of a partial vacuum within the container.

A container in accordance with the present invention is hot-filled with the panels projecting outwardly with respect to the body portion and is hermetically sealed in this configuration. The filled and sealed container is then cooled and, at the same time, directed to apparatus for contacting the outwardly bulging panels with sufficient pressure to cause them to experience an over-center transformation from an outwardly, bulging configuration to an inwardly collapsed configuration with respect to the body portions immediately contiguous to the panels. The cooling of the container and contents is continued and, if desired, a label is then applied to the container.

The mechanical application of force to the container walls can be achieved by various means including the introduction of the container between two abutments spaced apart at a distance about equal to the diameter of the body portion of the container yet sufficiently close together to force the outwardly bulging panels toward an inwardly collapsed position. Alternatively, the containers can be introduced into boxes or cartons having walls spaced apart such that the sides of the box presses on the outwardly bulging portions of the container forcing them to an inwardly collapsed position. Still other means can be provided for mechanically reconfiguring the outwardly bulging projections.

One feature of a container in accordance with the present invention is that the amount of volumetric reduction of the container can be engineered by determining the size and shape of the panel as well as the radius of curvature of the outward bulge as compared to the inward concavity as the panel goes through the over-center condition. This has the advantage of permitting the container including the reconfigurable panels to be specifically designed to accommodate a particular product with a known amount of thermal collapse subsequent to sealing thereby controlling the amount of any residual partial vacuum within the container once the product has cooled to its final thermal condition.

Another feature provided by the initially outwardly bulging panels being reconfigured to an inwardly collapsed position is that each panel causes a rather large change in volume thereby diminishing the number of panels necessary over that provided by panels which are initially configured to be concave. The reduction in the number of panels or proportion of surface area covered by such panels means that greater support can be given to any label applied to the container over such panels.

These and other features and advantages of the present invention will become apparent to those skilled in the art upon consideration of the following detailed description of preferred embodiments exemplifying the best mode of carrying out the invention as presently perceived. The detailed description particularly refers to the accompanying drawings.

DESCRIPTION OF THE PREFERRED EMBODIMENTS

Figure 1:
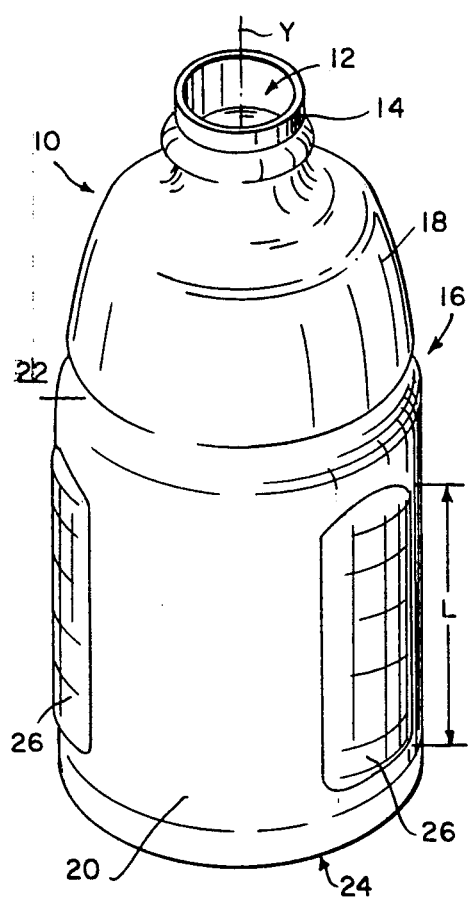
FIG. 1 is a perspective view of one embodiment of the container incorporating the present invention.

A container 10 in accordance with the present invention is shown in perspective in FIG. 1 to include an open mouth 12 at the top of the container surrounded by a neck portion 14 which can include external threads or other features for engaging a closure (not shown). Below the neck portion 14, the container 10 widens into a body portion 16 which includes the shoulder portion 18, a generally cylindrical wall portion 20 separated by a radially inwardly directed rib 22. A bottom portion 24 is joined unitarily to the lower perimeter of the cylindrical wall portion 20. The container 10 is generally symmetric about a vertical axis Y.

Figure 2:
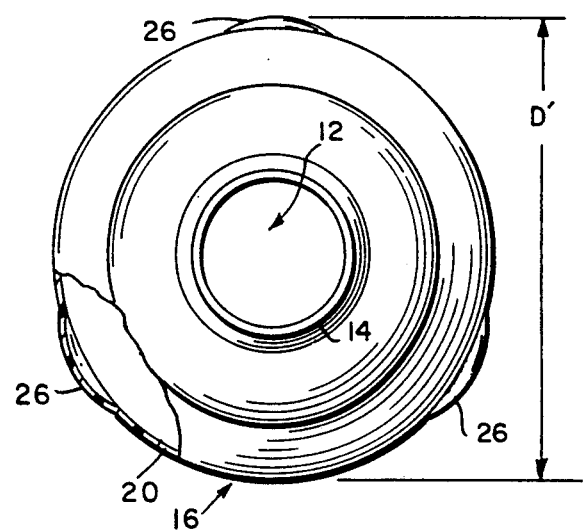
FIG. 2 is a top plan view of the container shown in FIG. 1, partially broken away.

To provide for a controlled reduction of the volume of the container, a plurality of reconfigurable panels 26 are provided. The container 10 is preferably made by blow-molding a PET parison within a blow mold, and tempering the blown container in accordance with the practices of U.S. Pat. No. 4,385,089, hereby incorporated by reference. The panels 26 are formed so as to be bulging outwardly with respect to the cylindrical wall portion 20 as best shown in FIG. 2. That is, the diameter D' across the container and outwardly bulging panel 26 is greater than merely the diameter of the cylindrical wall portion 20 by itself. While FIGS. 1 and 2 merely illustrate there to be three such reconfigurable panels 26, it will be appreciated that the number, shape and size of such panels is substantially dependent on the overall size of the container and the type and amount of material to be filled into the container.

Figure 3:
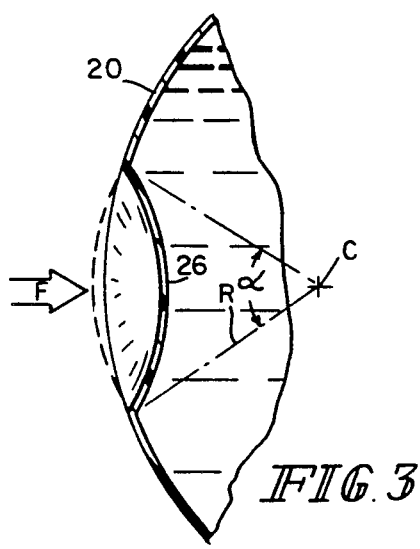
FIG. 3 is a sectional detail view of the container of FIG. 1 showing the transformation of the outwardly bulging portion of the side wall to an inwardly collapsed position.

Once the container is filled and hermetically sealed, the container and contents is introduced into a cooling station where means is provided for cooling the contents of the containers. Simultaneously, a force F is applied as shown in FIG. 3 to displace the panels 26 from the initial outwardly bulging position shown in phantom, through an unstable intermediate position, to the inwardly collapsed position shown in FIG. 3. It will be appreciated that such a reconfiguration of the panels 26 diminish the volume of the container by an amount equal to the space through which the panels travel as they are mechanically displaced from the outward projecting position to the inwardly collapsed position.

The panel 26 shown in FIGS. 1–3 constitutes a cylindrical wall portion of length L defined by a radius R from a center of curvature C which is necessarily off of the axis Y of the container 10. The volume displaced by the reconfiguration of each panel 26 from the outward projecting position to the inwardly collapsed position is merely equal to:

$$2LR^2(\alpha/2 - \sin(\alpha/2)\cos(\alpha/2))$$

where α is the included angle measured in radians. In a preferred embodiment, the number of panels, and the dimensions L, R, and α for each panel are selected such that the total volume displaced by the reconfiguration of the panels is about 50%–90% of the initial head space of the container when filled and sealed.

Figure 4:
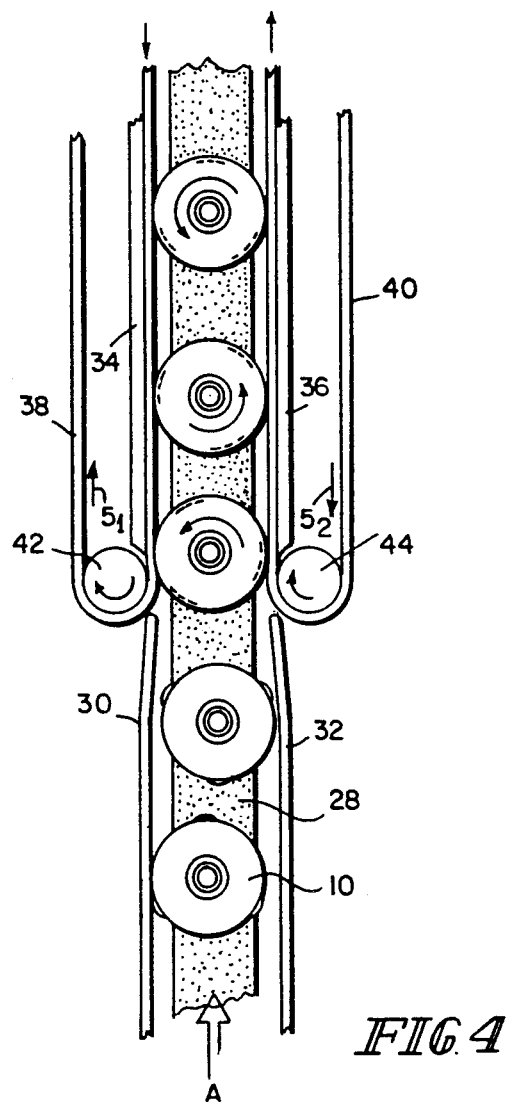
FIG. 4 is a plan view illustrating a method for mechanically reconfiguring the panels of the container of FIG. 1 subsequent to filling and capping the container.

While the reconfiguration of the panels can be achieved by any convenient means, FIG. 4 illustrates one possible embodiment wherein bottles 10 emerging from a filling and capping operation (not shown) are transported on a belt conveyer 28 in the direction of arrow A while cooling. A pair of rails 30 and 32 direct the containers 10 between a pair of spaced abutments 34 and 36. The abutments 34 and 36 are spaced apart by a distance approximately equal to the diameter of the cylindrical body portion 20 of the containers 10. Each abutment 34 and 36 is shown to be faced with a moving belt 38 and 40 respectively. The belts 38 and 40 are powered by capstans 42 and 44, respectively, to travel at slightly different speeds in the directions shown by arrows $S_1$ and $S_2$. The difference in direction and speed of the two belts 38 and 40 causes the containers 10 to be rotated about their axis of symmetry Y, as they move in the direction of arrow A. The belts 38 and 40 backed by the abutments 34 and 36 come in contact with all of the panels 26 with sufficient force as to reconfigure the panel to an inwardly collapsed position. Preferably, the abutments 34 and 36 are of sufficient length and the belts 38 and 40 are traveling at sufficient speed such that each of the panels 26 are contacted by the abutments a number of times so as to ensure the inward reconfiguration of panels during the cool-down of the containers and contents. The cooling operation can be enhanced by providing a shower of chilled water or other liquid. After the bottles emerge from the cooling and reconfiguring station shown in FIG. 4, they can then be labeled, if desired.

Figure 5:
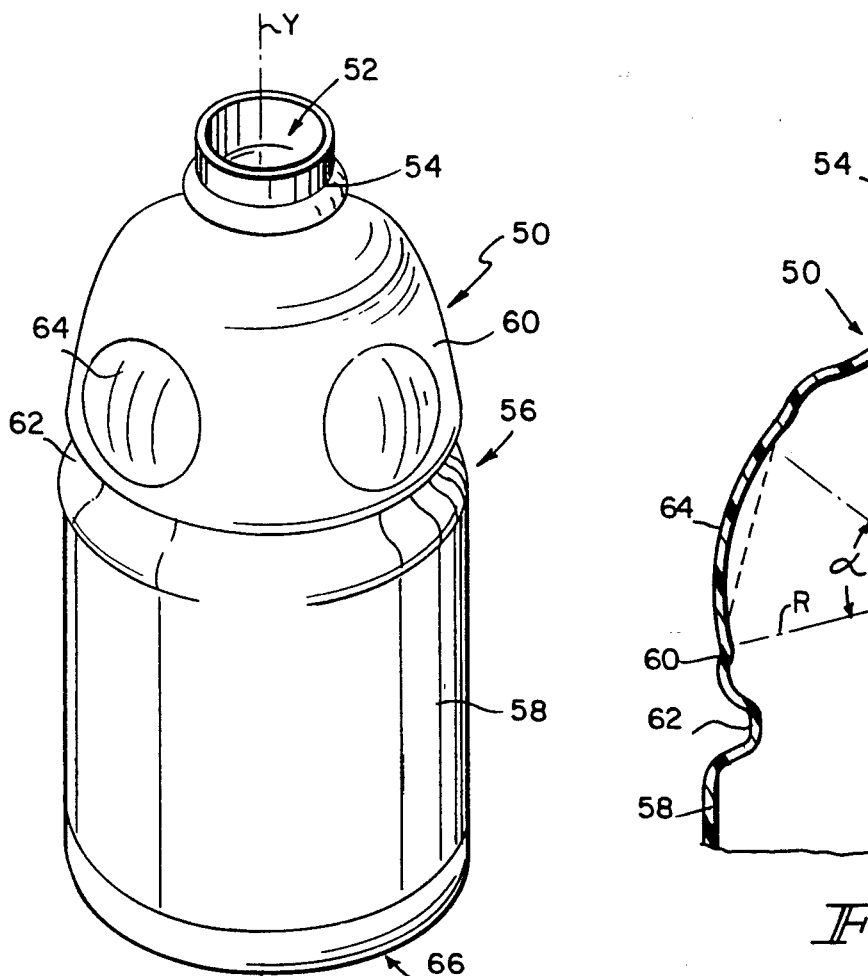
FIG. 5 is a perspective view of an alternative embodiment of a container in accordance with the present invention.

FIG. 5 shows in perspective an alternative embodiment of a container 50 in accordance with the present invention. The container 50 is generally symmetric about a vertical axis Y through the center of mouth 52 defined by neck 54. Below the neck portion 54, the container 50 includes a body portion 56 including a generally cylindrical wall portion 58 adapted to receive a label and a shoulder portion 60 situated above the peripheral ring 62. The shoulder portion 60 includes a plurality of reconfigurable panels 64. The panels 64 are illustrated to be circular, thus having equal horizontal and vertical dimension. The container 50 is completed by a bottom portion 66 unitarily joined to the cylindrical side wall portion 58.

Figure 6:
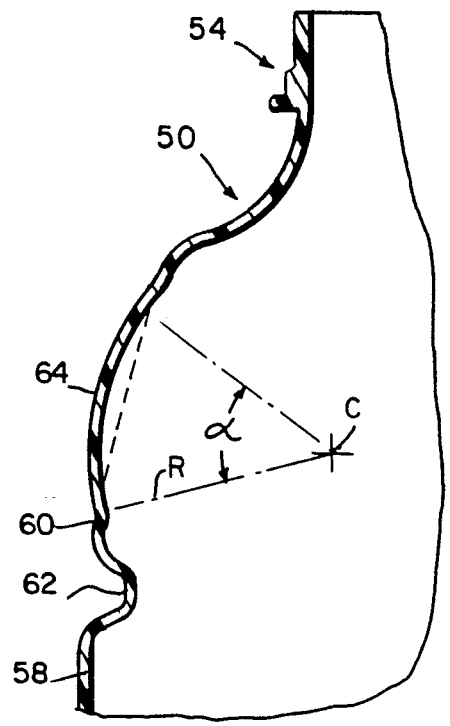
FIG. 6 is a sectional detail view of the container of FIG. 5 showing the reconfigurable panel in an outwardly bulging configuration.

The reconfigurable panels 64 are illustrated in cross section in FIG. 6 to be defined by a radius vector R from a center of curvature C through an angle α. It will be appreciated that the center of curvature C is displaced off of the axis of symmetry Y and that the reconfigurable panels 64 bulge outwardly with respect to the contiguous portion of the shoulder 60 immediately adjacent thereto.

Figure 7:
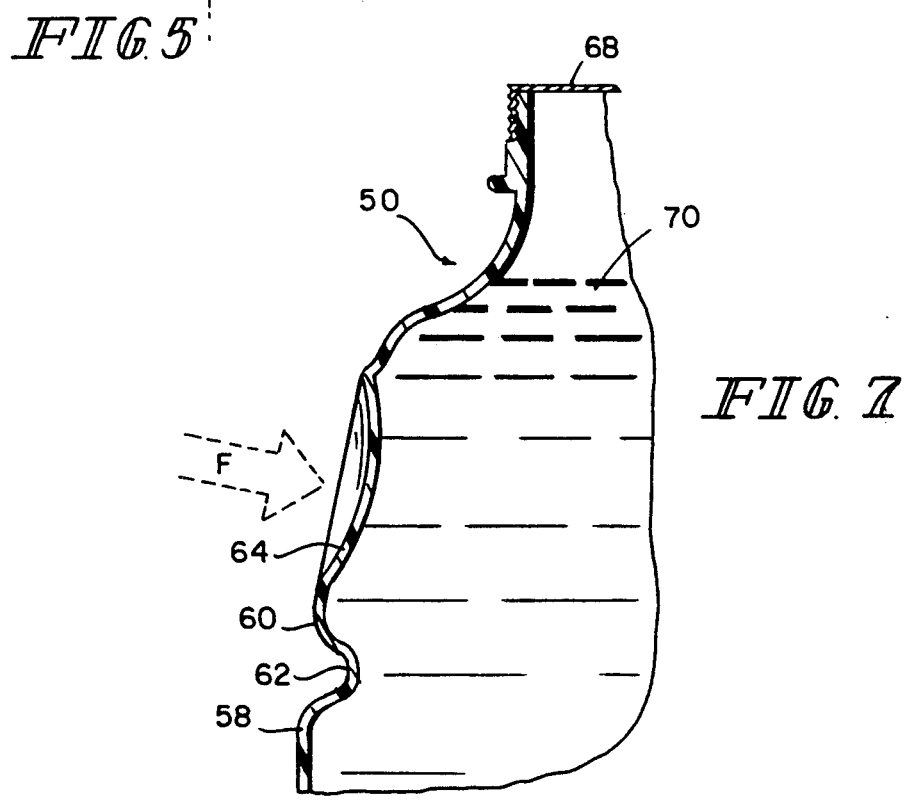
FIG. 7 is a sectional detail view showing the container of FIG. 5 filled and capped with the reconfigurable panel in an inwardly collapsed position.

FIG. 7 shows the container 50 after being filled with a liquid or semi-liquid 70 and hermetically sealed by a cap 68. An external force F has mechanically reconfigured the panel 64 from the outwardly bulging position shown in FIGS. 5 and 6 to the inwardly collapsed position shown in FIG. 7. This mechanical reconfiguration provides a controlled reduction in the volume of the container by an amount about equal to:

$$4R(\alpha R^2/3 - \pi \sin(\alpha/2)\cos(\alpha/2))$$

for each panel where R is the radius of the panel from its center of curvature and α is the included angle of the panel expressed in radians as shown in FIG. 6. The reconfigurable panel is designed to be stable in either the outwardly bulging or inwardly collapsed position. The embodiment which is shown in FIGS. 5–7 exhibits somewhat greater stability than the embodiment shown in FIGS. 1–3 since there is less hydraulic pressure presented to the inside surface of the panels of the embodiment shown in FIGS. 5–7 by the mere weight of the liquid contained within the container. On the other hand, the embodiment shown in FIGS. 1–3 may have more consumer acceptance as the reconfigurable panels can be more easily hidden by an appropriate label.

Although the invention is described in detail with reference to certain preferred embodiments, variations and modifications exist within the scope and spirit of the invention as described and as defined in the following claims.

What is claimed is:

1. A method of filling a thermoplastic container with a hot fluid comprising the steps of:
   providing a container made of thermoplastic material having a neck portion, a body portion, and a bottom portion, the body including a plurality of panels situated in circumferentially spaced locations around the periphery of the container, the panels bulging outwardly with respect to the body portion immediately contiguous thereto,
   filling the container with a fluid having a temperature greater than about 50° C. and capping the container before a 5% drop in temperature of the fluid occurs, and
   contacting the plurality of panels while cooling the container and contents such that the panels are reconfigured to an inwardly collapsed position with respect to the body portion immediately contiguous thereto for providing controlled volumetric reduction of the container to compensate for the development of a partial vacuum within the container.

2. The method of claim 1 wherein the filling step is performed with a fluid having a temperature between about 80° and 95° C., the capping step is performed before a 1% drop in temperature of the fluid occurs.

3. The method of claim 1 wherein the contacting step comprises the step of:
   directing the filled and capped container between two abutments spaced apart at a selected distance about equal to a diameter of the body portion of the container, the abutments forcing the panels to an inwardly collapsed position with respect to the body portion immediately contiguous thereto.

4. The method of claim 3 wherein the contacting step further comprises the step of:
   rotating the filled and capped container between the two spaced abutments so as to serially force each of the panels situated in circumferentially spaced locations around the periphery of the container to an inwardly collapsed position with respect to the immediately contiguous body portion.

* * * * *